US009127968B2

(12) United States Patent
Cuddihy et al.

(10) Patent No.: US 9,127,968 B2
(45) Date of Patent: Sep. 8, 2015

(54) FLEXIBLE OPTICAL IMPACT DETECTION SENSOR FOR FRONT RAIL MOUNTED AIRBAG

(71) Applicant: FORD GLOBAL TECHNOLOGIES, LLC, Dearborn, MI (US)

(72) Inventors: Mark A. Cuddihy, New Boston, MI (US); Manoharprasad K. Rao, Novi, MI (US); Jialiang Le, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/082,455

(22) Filed: Nov. 18, 2013

(65) Prior Publication Data

US 2015/0142271 A1 May 21, 2015

(51) Int. Cl.
*B60R 22/00* (2006.01)
*G01D 5/353* (2006.01)
*B60R 19/20* (2006.01)
*B60R 21/0136* (2006.01)
(Continued)

(52) U.S. Cl.
CPC ............ *G01D 5/3537* (2013.01); *B60R 19/205* (2013.01); *B60R 21/0136* (2013.01); *B60R 2021/0023* (2013.01); *B60R 2021/01013* (2013.01)

(58) Field of Classification Search
CPC ............ B60R 2021/0023; B60R 21/00; B60R 2021/346; B60R 2021/36
USPC .......................................................... 701/45
See application file for complete search history.

(56) References Cited

U.S. PATENT DOCUMENTS 3,610,657 A 10/1971 Cole
3,822,076 A 7/1974 Mercier et al.
(Continued)

FOREIGN PATENT DOCUMENTS

DE 4114016 11/1992
DE 102004027614 12/2005
(Continued)

OTHER PUBLICATIONS

Moditech Rescue Solutions BV, http://www.moditech.com/rescue/index3.php?action=safety_systems&page=airbag (Sep. 9, 2013).
(Continued)

*Primary Examiner* — James Trammell
*Assistant Examiner* — Michael D Lang
(74) *Attorney, Agent, or Firm* — Frank A. MacKenzie; Price Heneveld LLP

(57) ABSTRACT

A flexible optical impact detection sensor is mounted on an outboard portion of the front bumper for signaling an offset rigid barrier impact event to a forward corner of a motor vehicle and deployment of a small offset rigid barrier airbag mounted on the front rail. The airbag is attached proximate a distal end of a front rail. The flexible optical impact detection sensor, attached to a rear surface of an outboard portion of the front bumper, generates a signal upon a corner impact event, whereby a controller processes the signal generated by the impact detection sensor and electrically actuates an inflator upon a predetermined impact severity. The airbag in the inflated condition acts against the offset rigid barrier to generate a lateral force against the offset rigid barrier to push the motor vehicle away from the barrier and thereby redirect impact energy by lateral movement of the motor vehicle.

20 Claims, 7 Drawing Sheets

(51) Int. Cl.
   *B60R 21/00*  (2006.01)
   *B60R 21/01*  (2006.01)

(56) References Cited

U.S. PATENT DOCUMENTS

| | | | |
|---|---|---|---|
| 3,905,015 | A | 9/1975 | Inose et al. |
| 4,176,858 | A | 12/1979 | Kornhauser |
| 4,290,627 | A | 9/1981 | Cumming et al. |
| 4,360,223 | A | 11/1982 | Kirchoff |
| 4,518,183 | A | 5/1985 | Lee |
| 4,988,862 | A | 1/1991 | Beltz |
| 5,022,675 | A | 6/1991 | Zelenak, Jr. et al. |
| 5,064,299 | A * | 11/1991 | Hirschmann et al. ........... 385/33 |
| 5,513,877 | A | 5/1996 | MacBrien et al. |
| 5,564,734 | A | 10/1996 | Stuckle |
| 5,810,427 | A | 9/1998 | Hartmann et al. |
| 6,009,970 | A | 1/2000 | Breed |
| 6,106,038 | A | 8/2000 | Dreher |
| 6,279,944 | B1 | 8/2001 | Wipasuramonton et al. |
| 6,334,639 | B1 | 1/2002 | Vives et al. |
| 6,561,301 | B1 | 5/2003 | Hattori et al. |
| 6,623,054 | B1 | 9/2003 | Palmquist |
| 6,637,788 | B1 | 10/2003 | Zollner et al. |
| 6,728,613 | B2 | 4/2004 | Ishizaki et al. |
| 6,851,706 | B2 | 2/2005 | Roberts et al. |
| 6,923,483 | B2 | 8/2005 | Curry et al. |
| 6,942,261 | B2 | 9/2005 | Larsen et al. |
| 7,000,725 | B2 | 2/2006 | Sato et al. |
| 7,024,293 | B2 | 4/2006 | Ishizaki et al. |
| 7,036,844 | B2 | 5/2006 | Hammer et al. |
| 7,073,619 | B2 | 7/2006 | Alexander et al. |
| 7,150,495 | B2 | 12/2006 | Fayt et al. |
| 7,185,728 | B2 | 3/2007 | Makita et al. |
| 7,415,337 | B2 | 8/2008 | Hau et al. |
| 7,416,043 | B2 | 8/2008 | Pipkorn et al. |
| 7,424,179 | B2 | 9/2008 | Ohtaka et al. |
| 7,445,073 | B2 | 11/2008 | Munch et al. |
| 7,541,917 | B2 | 6/2009 | Hosokawa |
| 7,597,171 | B2 | 10/2009 | Bauer |
| 7,753,159 | B2 | 7/2010 | Kim et al. |
| 7,784,817 | B2 | 8/2010 | Choi et al. |
| 7,806,221 | B2 | 10/2010 | Mishra |
| 7,819,218 | B2 | 10/2010 | Eichberger et al. |
| 7,845,455 | B2 | 12/2010 | Kim et al. |
| 7,885,491 | B2 | 2/2011 | Nowsch |
| 7,926,847 | B2 | 4/2011 | Auer et al. |
| 7,954,587 | B2 | 6/2011 | Kisanuki et al. |
| 7,967,098 | B2 | 6/2011 | Choi |
| 8,002,312 | B2 | 8/2011 | Korechika et al. |
| 8,033,356 | B2 | 10/2011 | Kim |
| 8,353,380 | B2 | 1/2013 | Schonberger et al. |
| 8,398,154 | B1 | 3/2013 | Nusier et al. |
| 8,544,589 | B1 | 10/2013 | Rupp et al. |
| 8,662,237 | B2 | 3/2014 | Chung et al. |
| 8,672,078 | B2 | 3/2014 | Lee et al. |
| 8,827,356 | B2 | 9/2014 | Baccouche et al. |
| 2003/0020289 | A1 | 1/2003 | Dohrmann et al. |
| 2005/0269805 | A1 | 12/2005 | Kalliske et al. |
| 2006/0145459 | A1 | 7/2006 | Sendelbach et al. |
| 2007/0057490 | A1 | 3/2007 | Deflorimonte |
| 2007/0115104 | A1 | 5/2007 | Suzuki et al. |
| 2007/0198155 | A1 | 8/2007 | Danisch |
| 2007/0273165 | A1 | 11/2007 | Beck et al. |
| 2008/0122599 | A1 * | 5/2008 | Suzuki et al. ................. 340/436 |
| 2009/0102167 | A1 | 4/2009 | Kitte et al. |
| 2009/0218798 | A1 | 9/2009 | Garner |
| 2010/0133795 | A1 | 6/2010 | Fukuda et al. |
| 2011/0012328 | A1 | 1/2011 | Ewing et al. |
| 2012/0139216 | A1 | 6/2012 | Scott et al. |
| 2012/0144935 | A1 | 6/2012 | Murayama et al. |
| 2013/0278013 | A1 | 10/2013 | Baccouche et al. |
| 2014/0097604 | A1 * | 4/2014 | Chung et al. .................. 280/770 |

FOREIGN PATENT DOCUMENTS

| | | |
|---|---|---|
| DE | 102006021662 | 11/2007 |
| DE | 202009008753 | 11/2010 |
| EP | 0775613 | 5/1997 |
| JP | 2006321430 | 11/2006 |
| JP | 2011218857 | 11/2011 |
| JP | 2013220766 | 10/2013 |

OTHER PUBLICATIONS

Flexpoint Flexible Sensor Systems, http://www.flexpoint.com/technicalDataSheets/FlexpointBrochure1.pdf (1999).

Siemens Restraint Systems GmbH, "Development and Performance of Contact Sensors for Active Pedestrian Protection Systems" (undated).

* cited by examiner

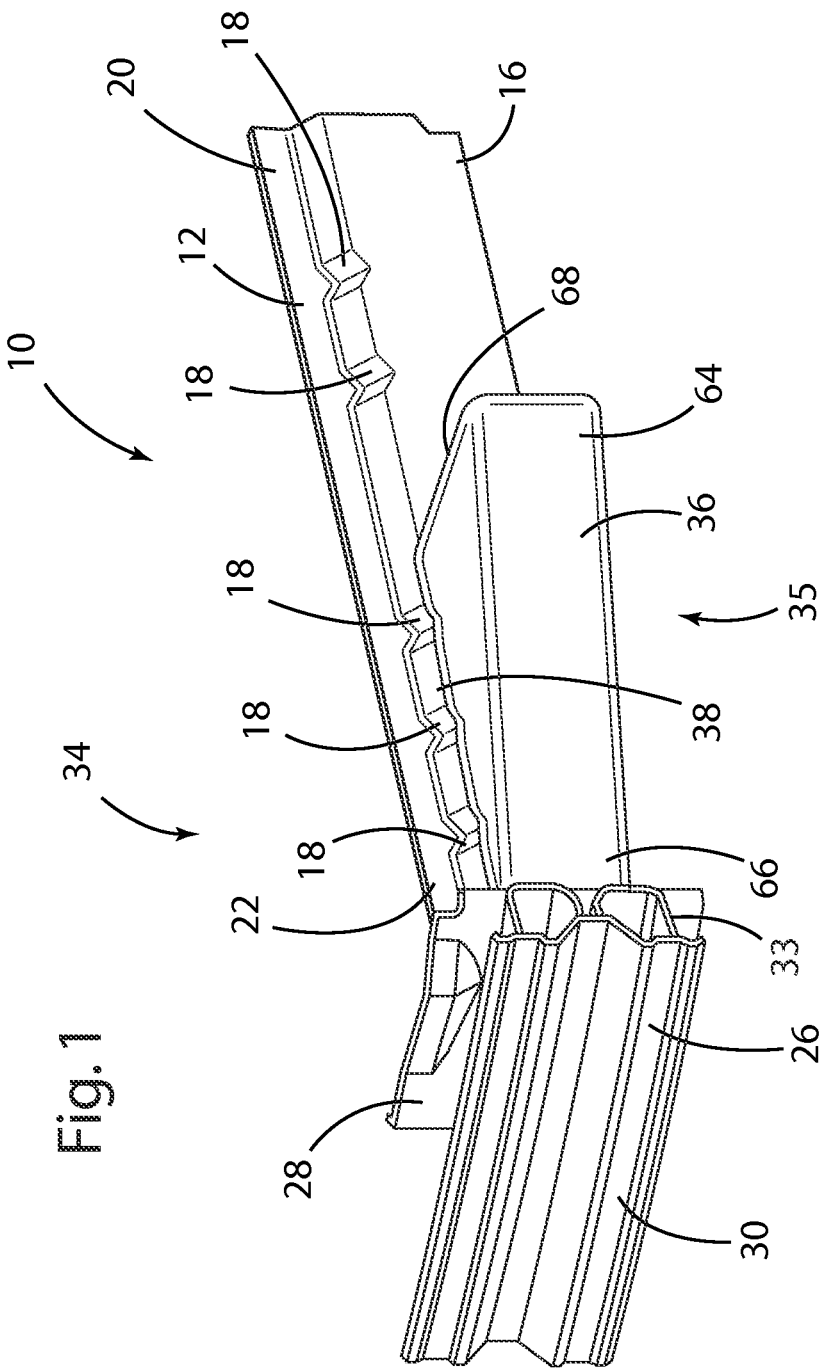

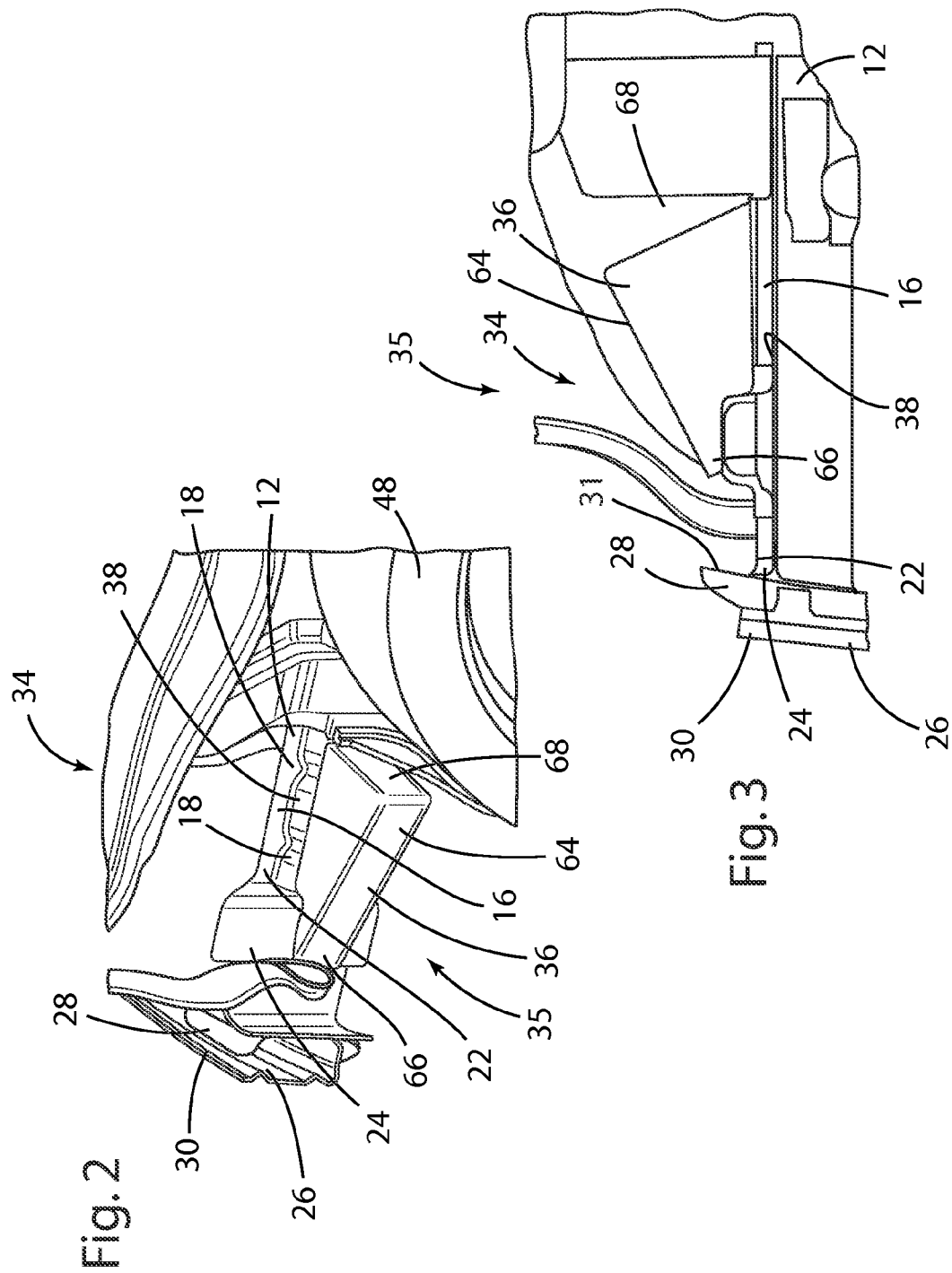

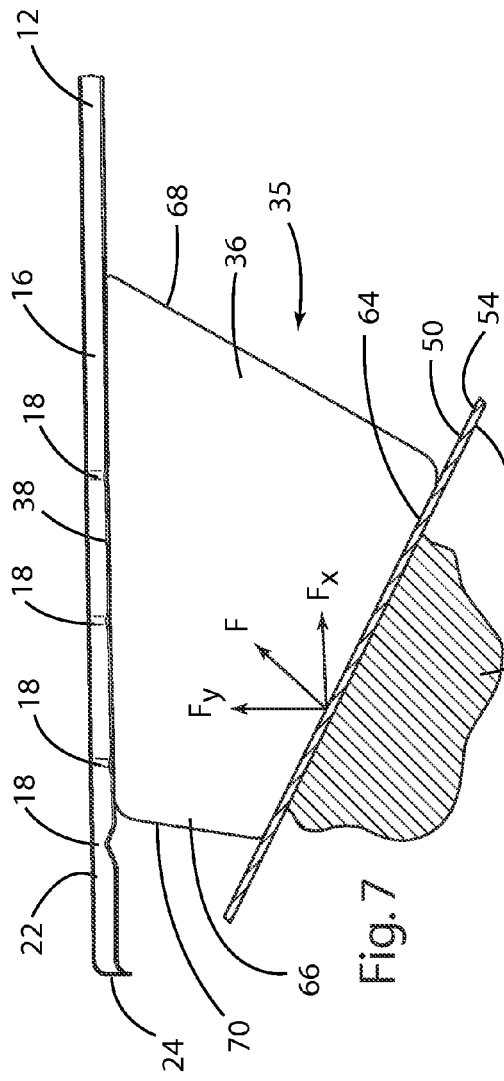
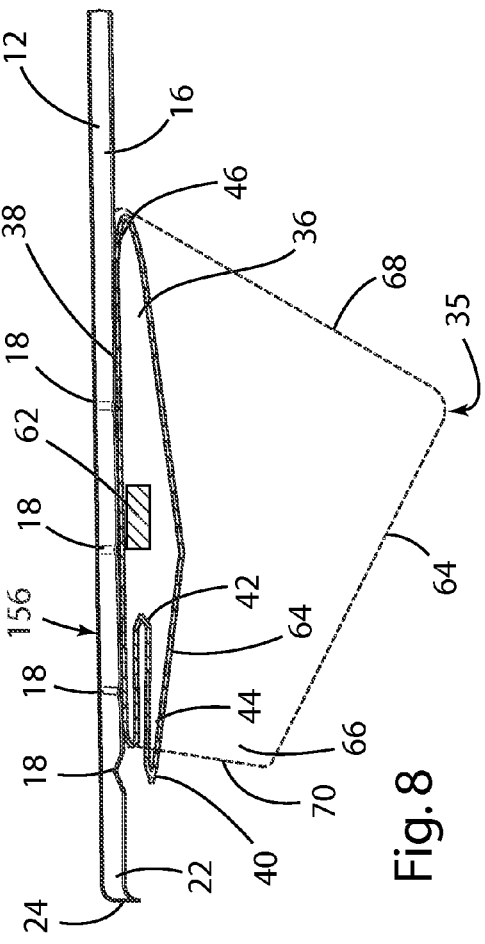

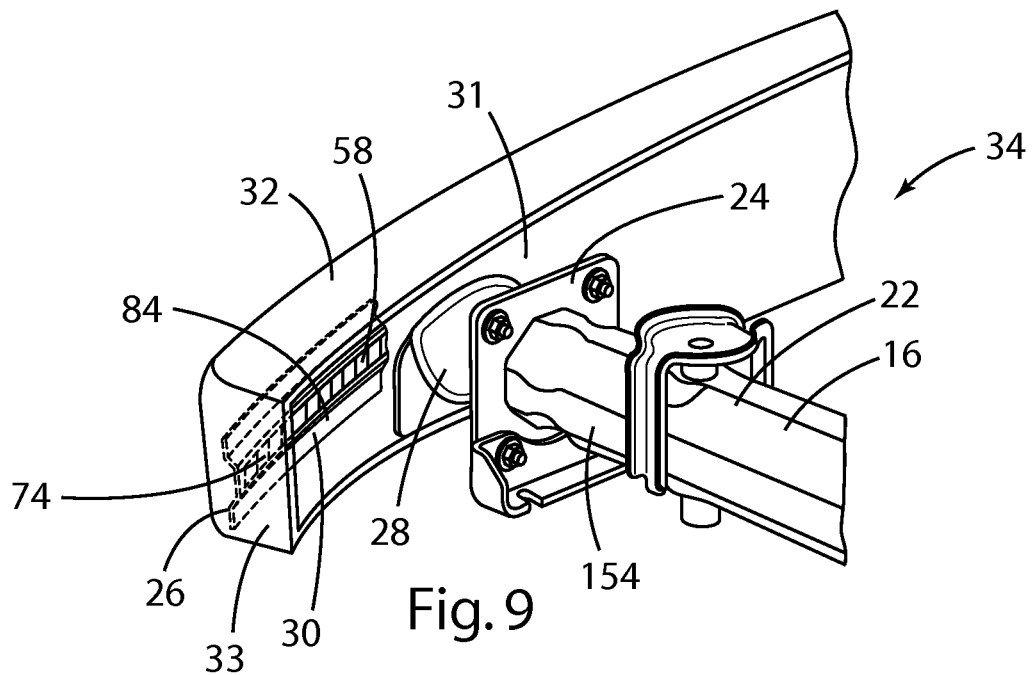
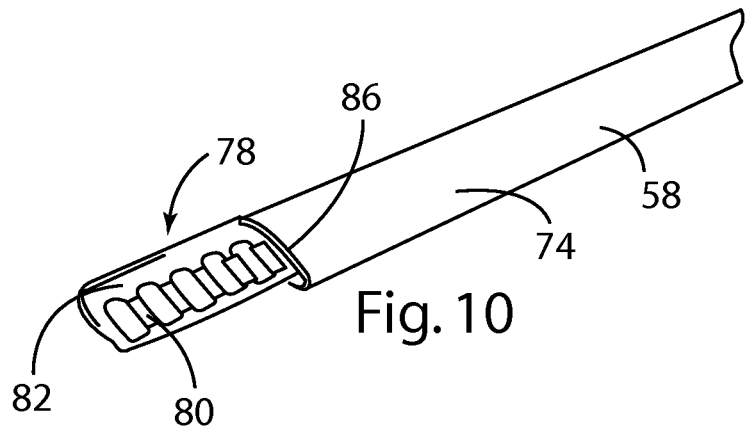
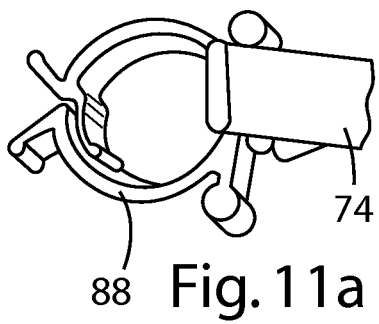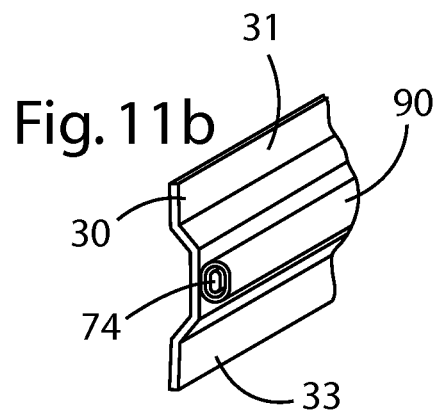

FLEXIBLE OPTICAL IMPACT DETECTION SENSOR FOR FRONT RAIL MOUNTED AIRBAG

CROSS REFERENCE TO RELATED APPLICATIONS

This application is related to U.S. Pat. No. 9,004,216 issued on Apr. 14, 2015, titled "FRONT RAIL MOUNTED AIRBAG" and U.S. application Ser. No. 14/082,443 filed on Nov. 18, 2013, titled "FLEXIBLE ELECTRO-RESISTIVE IMPACT DETECTION SENSOR FOR FRONT RAIL MOUNTED AIRBAG," the contents of which are hereby incorporated by reference in their entirety.

FIELD OF THE INVENTION

The present invention generally relates to an airbag, for a motor vehicle to minimize intrusion into the vehicle during an impact event, specifically a front side rail airbag that is triggered to inflate in the event of and to mitigate small offset rigid barrier impacts.

BACKGROUND OF THE INVENTION

Airbag, systems for use in motor vehicles are generally well-known in the art. Traditionally, such airbag systems have been used within motor vehicle interiors to mitigate and reduce occupant impacts with motor vehicle interior components and structures, such as steering wheels, dashboards, knee bolsters, side door panels, and body pillars.

The present disclosure, however, addresses the application of such airbag systems in combination with exterior motor vehicle components to manage and control motor vehicle impact events with external objects. In particular, the airbag system is adapted to manage and control an impact event to the front corner of the motor vehicle. That is, various testing protocols and standards are being and have been developed to address vehicle integrity in the event of such a collision. For example, the Insurance Institute for Highway Safety (MS) has adopted a new small offset frontal crash test, where the test objective is to manage and control damage and injuries resulting from actual motor vehicle impacts with stationary rigid poles (offset from the motor vehicle center of gravity and outside the main longitudinal rail), vehicle to vehicle collinear offset impacts (again, offset from the motor vehicle center of gravity), and vehicle to vehicle frontal oblique impacts. The IIHS test protocol involves the evaluation of such impacts against a rigid pole and currently envisions using a 25 percent overlap rigid barrier with a curved end simulating a 6-inch pole radius. The test impact velocity is 40 mph (64 kilometers per hour). The contemplated testing protocol is referred herein as the 40 mph Small Offset Rigid Barrier ("SORB") impact test.

In view of the SORB test protocol, current front end structures are being evaluated to optimize vehicle performance in small offset pole impact events. Hence, solutions for mitigating SORB impacts would be advantageous.

The airbag assembly disclosed herein particularity accomplishes the foregoing optimization of vehicle performance by providing a deployable structure mounted to the front side rail of the vehicle behind the bumper. Upon vehicle impact with the SORB, a front bumper mounted sensor sends a signal to an electronic control unit or ECU. Once the signal is processed, the ECU activates a side rail mounted inflator deploying the airbag. The airbag design is configured such that the airbag will deploy in a triangular shape, preferably creating a 30 degree angle with the longitudinal axis of the side rail and the motor vehicle. The 30 degree angular end of the triangular deployed airbag is preferably closest to the front bumper system of the vehicle. This deployment configuration allows for the vehicle to generate a very high Y-force against the rigid barrier to propel the vehicle away from the barrier and thus redirect impact energy by lateral movement of the motor vehicle and thereby minimize vehicle intrusion.

SUMMARY OF THE INVENTION

According to one aspect of the present disclosure, an airbag system is disclosed that mitigates intrusion in the event of an offset rigid barrier impact to a forward corner of a motor vehicle. The airbag system comprises a motor vehicle front rail having a forward projecting distal end and an airbag attached proximate the distal end of the front rail, the airbag having a stowed condition and an inflated condition, wherein the airbag in the inflated condition has an inclined angular leading edge. An inflator is operationally coupled with the airbag and is responsive to electrical actuation for inflating the airbag with a gas. An impact detection sensor generates a signal upon an impact event, whereby a controller processes the signal generated by the detection sensor and electrically actuates the inflator upon computing a predetermined impact severity to the forward corner of the motor vehicle. The inclined angular leading edge of the airbag in the inflated condition acts against the offset rigid barrier so as to generate a lateral force against the offset rigid barrier to push the motor vehicle away from the barrier and thereby redirect impact energy by lateral movement of the motor vehicle.

Still another aspect of the present disclosure is an airbag system having a pair of airbags, wherein one of the pair of airbags is mounted on each side of the motor vehicle.

Yet another aspect of the present disclosure is an airbag system wherein the motor vehicle has a front wheel mounted proximate the front rail, and the airbag, is mounted forward of the front wheel.

An additional aspect of the present disclosure is an airbag system wherein the motor vehicle includes a body panel having an exterior and an interior surface, the airbag being disposed proximate the interior surface to act through the body panel to generate the lateral force against the offset rigid barrier.

Another aspect of the present disclosure is an airbag system utilizing an airbag having a substantially triangular configuration when in the inflated condition, where an angular leading edge corresponds to the hypotenuse of the triangular configuration, a forward end of the airbag corresponds to the apex of the triangular configuration, and a rearward end corresponds to the base of the triangular configuration.

Still another aspect of the present disclosure is an airbag system where the apex of the triangular configuration has an angle of about 30 degrees.

A further aspect of the present disclosure is an airbag system, wherein the motor vehicle is equipped with an automatic occupant restraint system having occupant restraint system deployment sensor, and the impact detection sensor is also the deployment sensor for the automatic occupant restraint system.

Yet a further aspect of the present disclosure is an airbag system having an impact detection sensor mounted to an interior surface of the outboard portion of the front bumper.

An additional aspect of the present disclosure is an airbag system having an impact detection sensor that detects bending of the outboard portion of the front bumper during the impact event.

Yet another aspect of the present disclosure is an airbag system having an impact detection sensor comprised of a conductive film that generates an electrical signal when bent.

A still further aspect of the present disclosure is an airbag system having an impact detection sensor comprising a fiber optic cable that generates a variable output signal in response to bending of the fiber optic cable.

Another aspect of the present disclosure is an airbag system for a motor vehicle comprising a front rail, an airbag attached to the front rail, the airbag when inflated having an angular leading edge, an inflator, a sensor for generating a signal upon an impact to the corner of the vehicle by an object, and a controller for receiving the signal from the sensor and actuating the inflator, wherein the angular leading edge of the airbag generates a lateral force against the object.

A yet additional aspect of the present disclosure is an airbag system utilizing a front rail having a distal end and an outer side surface, wherein the airbag is attached to the distal end of the front rail on the outer side surface of the front rail.

A further aspect of the present disclosure is an airbag system utilizing a pair of front rails extending forward from each side of the motor vehicle, with one each of a pair of the airbags is mounted on each of the outer side surfaces thereof.

Still another aspect of the present disclosure is a method of employing an airbag system to generate a lateral force against an offset rigid barrier to push the motor vehicle away from the barrier and thereby redirect impact energy by lateral movement of the motor vehicle, wherein the method comprises the steps of providing a motor vehicle front rail having a forward projecting distal end, attaching an airbag proximate the distal end of the front rail, the airbag having a stowed condition and an inflated condition, wherein the airbag in the inflated condition creates an inclined angular leading edge, equipping the airbag with an inflator operationally coupled with the airbag responsive to electrical actuation for inflating the airbag with a gas, providing an impact detection sensor for generating a signal upon an impact event, and providing a controller for processing the signal generated by the detection sensor, electrically actuating the inflator upon a predetermined impact severity to the forward corner of the motor vehicle, and presenting the inclined angular leading edge of the airbag in the inflated condition to act against the offset rigid barrier so as to generate a lateral force against the offset rigid barrier to push the motor vehicle away from the barrier and thereby redirect impact energy by lateral movement of the motor vehicle.

Yet another aspect of the present disclosure is a method wherein the airbag has a substantially triangular configuration when in the inflated condition, wherein the angular leading edge corresponds to the hypotenuse of the triangular configuration, a forward end of the airbag corresponds to the apex of the triangular configuration having an angle of about 30 degrees, and a rearward end corresponds to the base of the triangular configuration.

These and other aspects, objects, and features of the present disclosure will be understood and appreciated by those skilled in the art upon studying the following specification, claims, and appended drawings.

BRIEF DESCRIPTION OF THE DRAWINGS

In the drawings:

FIG. 1 is a front perspective view of a motor vehicle front side frame rail incorporating the first embodiment of the airbag for the airbag system in accordance with the present disclosure in the inflated condition;

FIG. 2 is a rear perspective view of a motor vehicle front side frame rail incorporating the first embodiment of the airbag for the airbag system in accordance with the present disclosure in the inflated condition;

FIG. 3 is a bottom view of the first embodiment of the airbag for the airbag system of the present disclosure in the inflated condition;

FIG. 7 is a top view of the second embodiment of the airbag in the inflated condition contacting the impact barrier in accordance with the present disclosure;

FIG. 8 is a top view of the second embodiment of the airbag in the stowed condition in accordance with the present disclosure;

FIG. 9 is a rear perspective view of the first embodiment of the installed bumper bending impact sensor for use with the airbag system of the present disclosure;

FIG. 10 is a top perspective view of the first embodiment of the bumped bending impact sensor for use with the airbag system of the present disclosure;

FIG. 11a is another perspective view of the first embodiment of the bumper bending impact sensor for use with the airbag system of the present disclosure;

FIG. 11b is yet another perspective view of the first embodiment of the bumper bending impact sensor for use with the airbag system of the present disclosure;

DETAILED DESCRIPTION OF THE PREFERRED EMBODIMENTS

For purposes of description herein, the terms "upper," "lower," "right," "left," "rear," "front," "vertical," "horizontal," and derivatives thereof shall relate to the invention as oriented in FIG. 11. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 14:
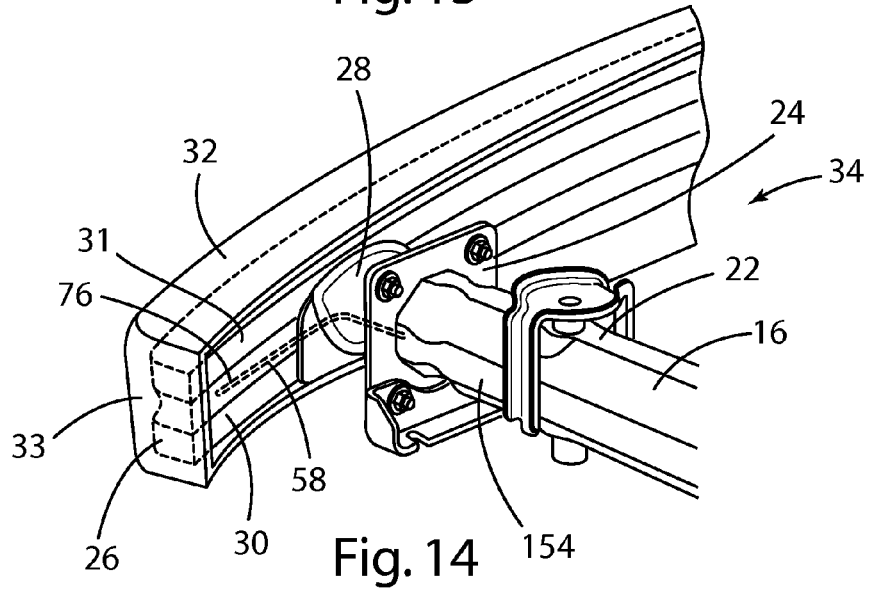
FIG. 14 is a rear perspective view of the second embodiment of the installed bumper bending impact sensor for use with the airbag system of the present disclosure.

Referring to FIGS. 1-4, a motor vehicle 10 includes a front frame 12 including a pair of front rails 16 of the motor vehicle. In the one embodiment of the present disclosure, the front frame 12 may extend substantially the length of the body, but in other configurations may extend outwardly and forward of a unibody body structure of the motor vehicle 10, as is typical of smaller vehicles. Each of the front rails 16 may have a beam configuration with integrated ribs 18 and flanges 20 for reinforcement, as shown in FIGS. 1-8. The front rails 16 may also have a tubular configuration, as shown in FIGS. 9 and 14. In either case, each of the front rails 16 include a front distal end 22 provided with a flange 24, to which a bumper assembly 26 may be attached, either directly or indirectly through an intermediate bumper bracket 28.

The bumper assembly 26 can adopt one of many possible configurations, but, as is typical, preferably includes a steel reinforcement beam 30 to which is attached an outer body fascia 32 having a decorative finish and color coordinated to the overall exterior color of the motor vehicle 10. The attachment of the bumper assembly 26 to the front rail can also include a low speed (i.e., 5-9 mph) impact mitigator 154, such as a polygel mitigator having a displaceable ram and tube assembly capable of absorbing impact energy from a low speed impact without damage to the distal end 22 of the front rails 16 and minimal damage to the outer body fascia 32, as shown in FIGS. 9 and 14.

The front rails 16, as well as other front body structures and engine components (in the case of front mounted engine motor vehicles) provide a deformable forward section 34 (which may also be used for impact mitigation), as is known in the art. It is contemplated and intended that the forward section 34 will deform upon contact with an object in a forward collision, such as in the aforementioned NCAP testing, to absorb the impact energy associated with such a forward collision. As is common on such systems, one or more accelerometers is used as a sensing device to generate an electrical signal upon the sudden de-acceleration of a frontal impact. This signal is then detected by an on-board electronic control unit or ECU 60 and then used to determine whether the installed occupant restraint system, such as one or more airbag assemblies, should be deployed within the occupant compartment in the event that a predetermined de-acceleration is detected.

A further optimization of vehicle structural performance for SORB impacts can be obtained by providing a front rail mounted airbag system 35 to mitigate intrusion in a 40 mph SORB impact. An airbag 36 is mounted in the stowed condition to an outer surface 38 of the "crash can" or deformable segment 156 of the distal end 22 of the front side rail 16, as best seen in FIG. 8. The front side rail mounted airbag 36 in the stowed condition preferably includes a number of predetermined folds 40, 42, 44, 46 to manage deployment, as noted below. Preferably, one each of a pair of the front side rail mounted airbags 36 is disposed forward each of the front wheels 48. Thus, the front side rail mounted airbag 36 is mounted to the front rail 16 of the motor vehicle 10 behind the front bumper assembly 26. Further, for cosmetic purposes, the motor vehicle 10 may also include a front side body panel 50, such as a forward fender shown in FIG. 7, having an exterior surface 52 and an interior surface 54, where the airbag 36 is disposed proximate the interior surface 54 and acts through the body panel 50 to generate a lateral force against the SORB barrier 56, as discussed below.

Upon vehicle impact with the SORB barrier 56, a sensor 58 sends a signal to an electronic control unit or ECU 60. Once the signal is processed, the ECU 60 activates an inflator 62 operationally coupled with the front side rail mounted airbag 36, deploying the front side rail mounted airbag 36. The airbag 36 is preferably configured such that the airbag 36 will deploy in a substantially triangular configuration when in the inflated condition, thereby creating an angular leading edge 64 corresponding to the hypotenuse of the triangular configuration, a forward end 66 of the airbag corresponding to the apex of the triangular configuration and preferably having an angle of about 30 degrees, and a rearward end 68 corresponding to the base of the triangular configuration. This deployment configuration allows for the vehicle to generate a very high lateral or Y-force against the SORB barrier 56 to propel the motor vehicle 10 laterally away from the SORB barrier 56 and thus redirect impact energy by lateral movement of the motor vehicle 10 and thereby minimize vehicle intrusion, as best shown in FIG. 7.

Figure 4:
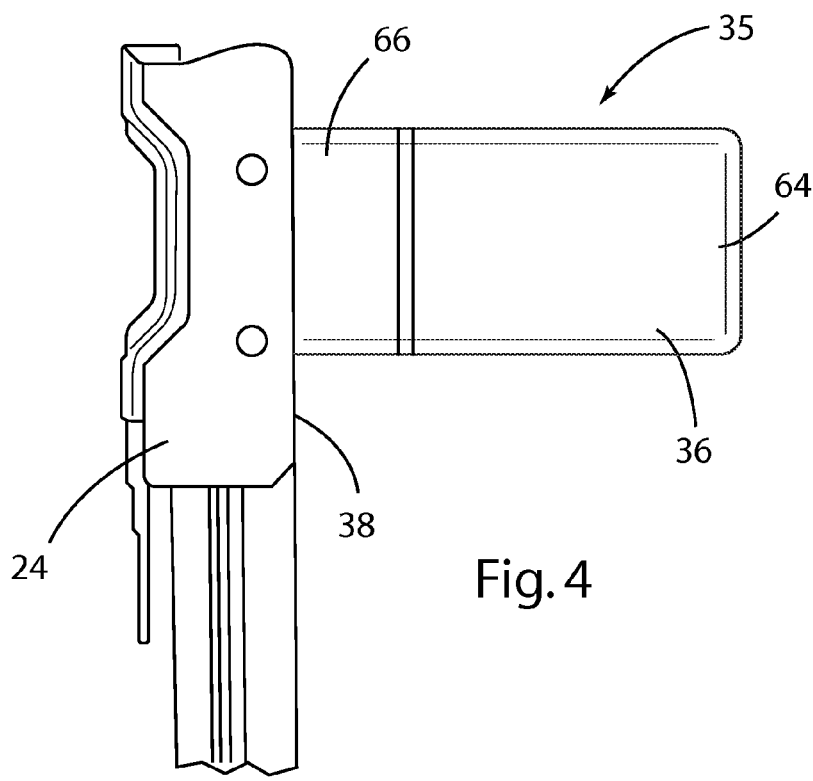
FIG. 4 is a front view of the first embodiment of the airbag in the inflated condition in accordance with the present disclosure.
Figure 5:
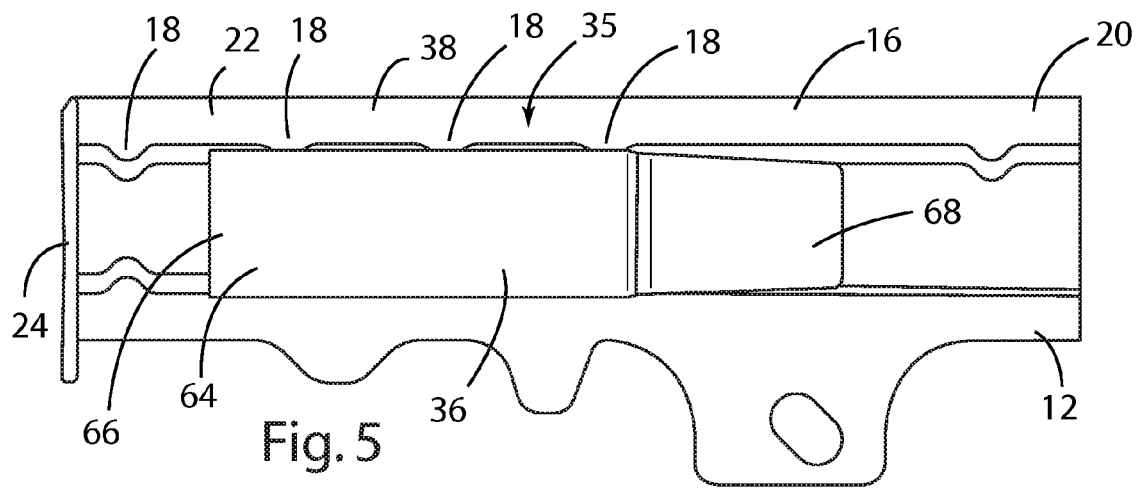
FIG. 5 is a side view of the first embodiment of the airbag in the inflated condition in accordance with the present disclosure.
Figure 6:
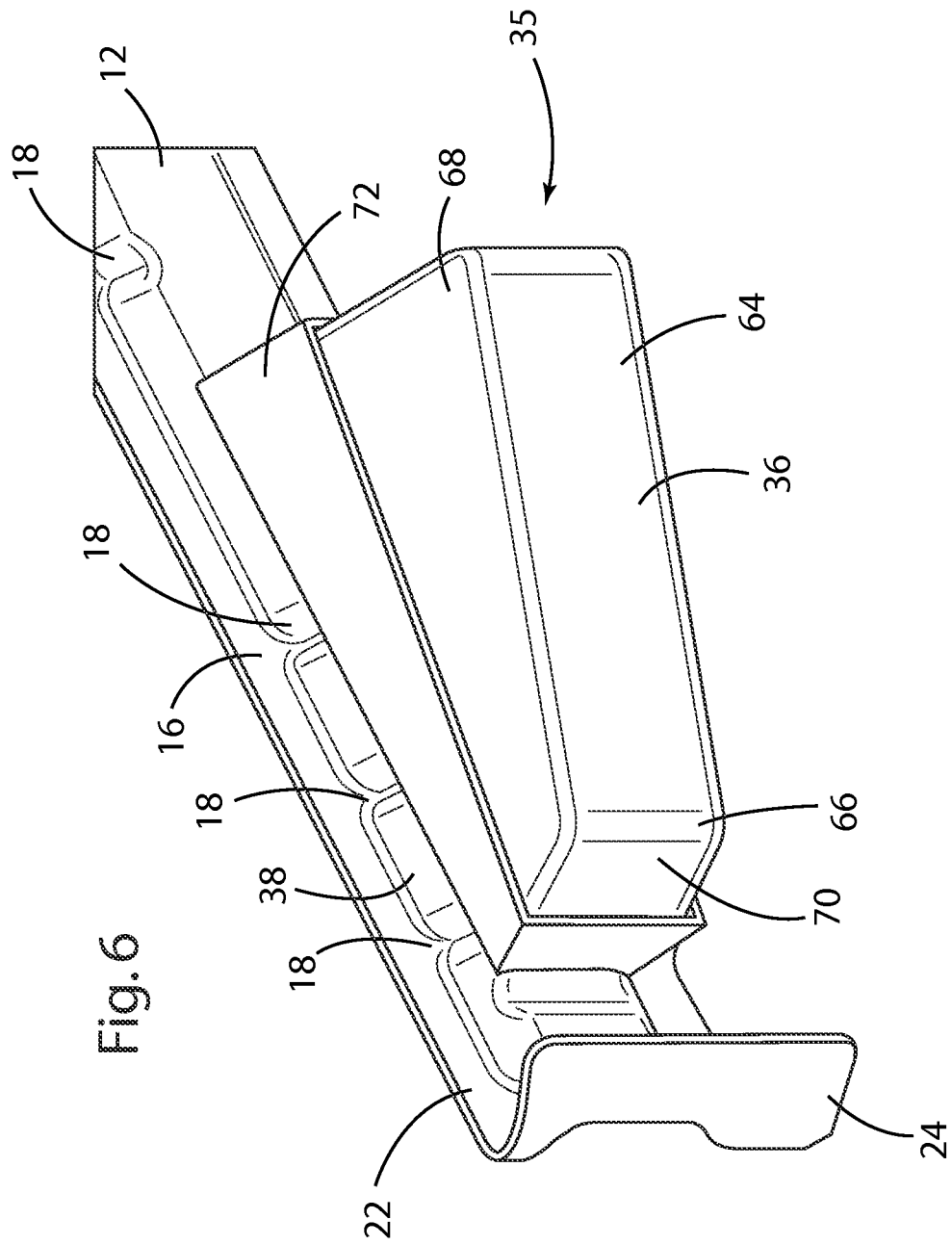
FIG. 6 is a front perspective view of a second embodiment of the airbag in the inflated condition in accordance with the present disclosure.

As shown in FIGS. 6-8, the forward end 66 of the airbag may be extended laterally outwardly to form an offset wall 70 in order to fill the space between the folded airbag and the interior surface 54 of the front side panel 50. However, it will be noted that the angular leading edge 64 is disposed at the same approximately 30 degree angle with the longitudinal axis of the motor vehicle so as to generate the Y-force necessary to laterally move the motor vehicle 10. Also, as shown in FIG. 6, it may be helpful to mount the stowed airbag 36 within a frame 72, preferably fabricated from steel or aluminum, to create a reinforced space within which the airbag 36 can be inflated and thus maintain the shape of the angular leading edge 64 when deployed and in contact with the SORB barrier 56.

As noted previously, accelerometers may be used as a sensing device to generate an electrical signal upon the sudden de-acceleration of a frontal impact to deploy airbag(s) within the occupant compartment in the event that a predetermined de-acceleration is detected. These accelerometers may also be employed to signal a vehicle impact with the SORB. However, under certain circumstances, such as small overlap frontal impacts, the time taken by the traditional frontal impact sensing systems may not be ideal and may not provide adequate time for proper deployment of the disclosed airbag structure. These kinds of impacts may need additional sensing systems especially designed for sensing small overlap frontal impacts, depending on vehicle front structure, impact velocity, and the object with which the impact occurs.

Thus, preferably a separate front bumper mounted sensor 58 is used to send a signal to the ECU 60 (such as that shown in FIG. 12) for inflation of the airbag 36 upon impact with a SORB barrier 56, preferably within 5 to 15 milliseconds after the impact event begins. Indeed, the front side rail airbag 36 is preferably fully deployed and in position before front rails 16 and crash can 154 starts deforming (roughly 10 to 20 milliseconds), depending on the vehicle front end structure. Therefore, in addition to traditional motor vehicle crash sensors, a front bumper mounted sensor 58 for determining bending in the bumper reinforcement beam 30 can be employed to more rapidly send a signal to the ECU 60 assigned to the front bumper mounted sensor 58 mounted to an outboard portion of the front bumper. This location provides the ideal signal for sensing the SORB impact event, regardless of sensor design. However, it is a hostile environment, subject to temperatures of 105° C. and salt spray from wheel splash when driving during precipitation. Two preferred concepts are one or more electro-resistive beam bending sensors 74 mounted on the front bumper beam or one or more front bumper beam bending sensors 76 based on optical fiber technologies.

The first concept, a flexible electro-resistive sensor 74, is a flexible sensor design which monitors for bending of the bumper reinforcing beam 30 located behind the front fascia 32. The flexible electro-resistive sensor 74 includes a force-resistive film 78, which consists of a conductive ink 80 printed on a clear plastic membrane 82. The conductive ink 80 changes resistance in response to material stress experienced when the membrane 82 bends. By app rig a voltage and measuring the change, the amount of bending in the flexible electro-resistive sensor 74 can be measured, as shown in FIG. 9. Thus, in an impact event, the membrane 82 bends and an electrical signal generated to measure and compare the actual impact severity against the predetermined impact severity to determine if airbag 36 actuation is required. If the deflected signal equals or exceeds a signal level corresponding to a predetermined impact severity, airbag 36 deployment is initiated. Since the flexible electro-resistive sensor 74 operates on current levels that are insufficient to engage automotive grade communication protocol, the current level of the flexible electro-resistive signal 74 must be increased in a separate step, after which the signal is output at automotive voltag.

The flexible electro-resistive sensor 74 is mounted to a rear surface 31 of the outboard portion 33 of the frontal bumper beam 30, forward of the front frame side rail 16, to detect a small offset impact event that initially causes bending only in the outboard portion 33 of the front bumper beam 30. Such bending occurs only when impacting an object of sufficient mass to deflect the sheet metal bumper beam 30 and is not subject to localized, short duration impacts which are largely resonant and does not result in significant displacement in the bumper beam 30. This improves the discrimination capabilities of the flexible electro-resistive sensor 74 versus an accelerometer, which is subject to oscillatory signals from vibrations. To provide a timely decision signal, the flexible electro-resistive sensor 74 is preferably mounted directly to a rear surface 31 of the outboard portion 33 of the front bumper beam 30, as shown in FIG. 9. This mounting location is superior to mounting the electro-resistive front bumper beam bending sensor 74 on the bumper fascia 32, in that the front bumper beam 30 is more structurally robust than the fascia 32, and does not bend due to incidental impacts with lower mass objects, such as shopping carts and bicycles.

In order for a flexible membrane sensor to function and survive in this environment, the force-resistive film sensor preferably employs a conductive ink 80 that retains its electrical properties at high temperatures (i.e., above 100° C.). The flexible electro-resistive sensor 74 is also preferably coated with a waterproof, but flexible, coating 86 to protect the ink 80 from water and salt spray, as shown in FIG. 10. The coating 86 may be a separate, solid piece wrapped around the flexible electro-resistive sensor 74 or a tube which surrounds the flexible electro-resistive sensor 74 and is sealed at the ends. The coating 86 may be dipped or sprayed over the flexible electro-resistive sensor 74. The coating 86 thus protects the flexible electro-resistive sensor 74 from temperature extremes and liquid exposure that occurs on the front bumper assembly 26. The coating 86 materials must be flexible enough when applied that they do not interfere with the bending properties of the flexible electro-resistive sensor 74.

In addition, the flexible electro-resistive sensor 74 may be bonded to the metal of the bumper beam 30 with an adhesive, so the entire length of the flexible electro-resistive sensor 74 is fixed and must expand and contract along with the bumper. However, the different thermal expansion coefficients of the force-resistive film sensor ink 80 and membrane 82 and the sheet metal of the front bumper beam 30 to which it is mounted induces an inherent drift in the signal with temperature changes, which can be significant when compared to the output of the flexible electro-resistive sensor 74 when bent. To minimize such drift, the flexible electro-resistiye sensor 74 is preferably mounted at fixed points along its length. These could be wire clamps 88 attached to the flexible electro-resistive sensor 74 or built into the protective coating 86, as shown in FIG. 11a. It could also be a channel 90 rigidly attached or built into the bumper beam 30, within which the flexible electro-resistive sensor 74 loosely lies, as shown in FIG. 11b. Such arrangement allows the flexible electro-resistive sensor 74 elements, that is, ink 80, membrane 82, and coating 86, to thermally expand and contract without regard to the thermal expansion and contraction of the front bumper beam 30, reducing the amount of signal drift incurred from the thermal cycling of the system. The flexible electro-resistive sensor 74 can thus be utilized for detecting a SORB impact event in a timely manner. Further, the flexible electro-resistive sensor 74 is relatively low cost and robust to the environment, maintaining its sensing capabilities through liquid spray and temperature changes.

Figure 12:
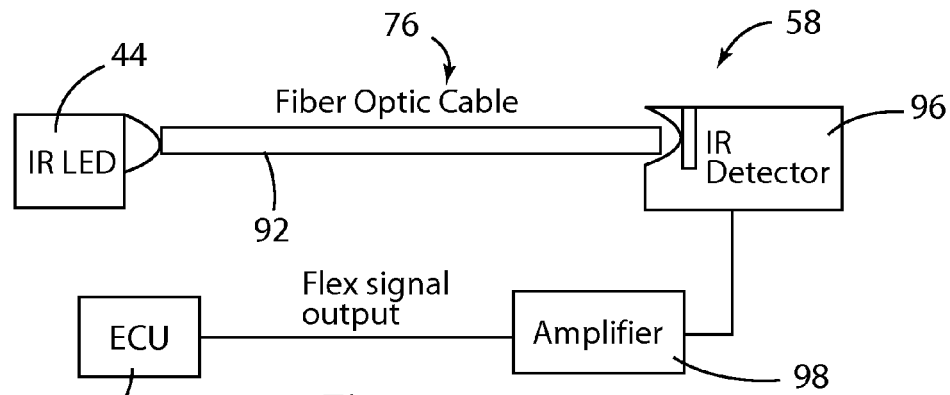
FIG. 12 is a schematic view of the second embodiment of the bumper bending impact sensor for use with the airbag system of the present disclosure.

Alternatively, a flexible fiber optic sensor 76 may be used to detect an SORB impact. The flexible fiber optic sensor 76 consists of a fiber optic cable 92, light source 94, photodiode 96, and amplifier 98, as shown in FIG. 12. The tight source 94, preferably an infrared light-emitting diode (LED), sends a light signal through the fiber optic cable fiber 92, which is received by the photodiode 96, preferably an infrared detector, which in turn outputs an electrical signal from an amplifier 98 proportional to the quantum of light received.

Figure 13:
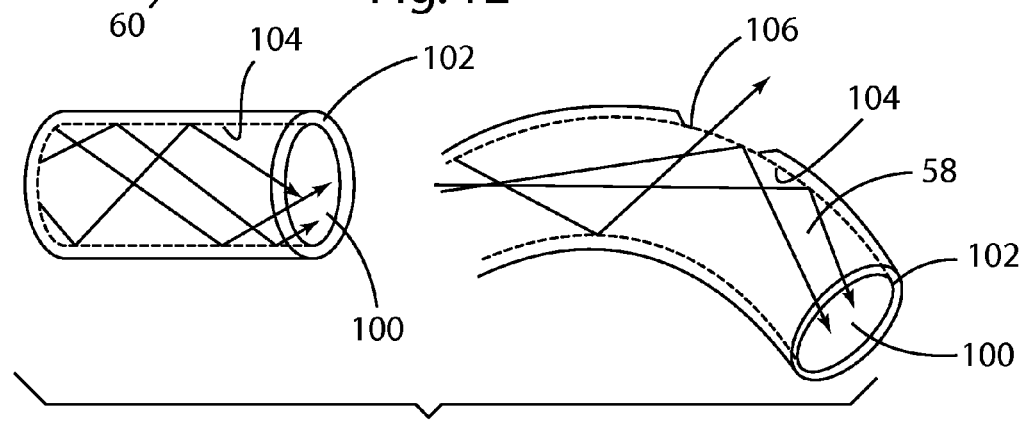
FIG. 13 is perspective view of the second embodiment of the bumper bending impact sensor for use with the airbag system of the present disclosure.

The flexible fiber optic cable 92 consists of a core material 100 surrounded by a thin layer of cladding material 102 having a different index of refraction than that of the core material 100. Normally, any light that bounces off the walls 104 of the core material 100 is reflected back into the core material 100 and no light is lost due to bending of the cable. However, if a partial portion of the cladding is removed to form a bare portion 106 on the core material 100, as shown in FIG. 13, a portion of the light which strikes the wall 104 of the core material 100 at an angle will escape the core material 100. Bending the flexible fiber optic cable 92 allows even more light to escape. The quantum of light striking the photodiode 96 will be thus changed by being reduced, and the signal of the photodiode 96 will be changed by being reduced, indicating the degree of bending of the fiber optic cable 92. Further, if the cladding 102 is removed on only one side of the fiber optic cable 92, the photodiode 96 can be used to detect a directional signal, indicating whether the fiber optic cable 92 is bending towards the bare portion 106 of the modified side of the fiber optic cable 92 or away from it.

As noted above, in the SORB test mode, the impact is preferably detected within 5 milliseconds of initial contact in order to provide timely activation of the front side rail airbag 36. By carefully placing the fiber optic cable 92 in the area of interest and modifying the cladding 102 to produce bare portions 106 in a defined pattern, the flexible optical sensor 76 can be adapted to provide a signal to specifically detect the SORB crash mode. As shown in FIG. 14, the fiber optic cable can be mounted to the back surface 31 of the outboard portion 33 of the bumper reinforcement beam 30 and also to the distal portion 22 of the frame rail 16 near the flange 24. In this configuration, the flexible optical sensor 76 senses any rearward bending of the outboard portion 33 of the front bumper assembly 26. In order to accommodate this specific mode, the cladding 102 is removed to form bare portions 106 in specific areas of the fiber optic cable 92. That is, the section of the fiber optic cable 92 directly mounted to the outboard portion 33 of the front bumper reinforcement beam 30 preferably has cladding 102 removed to form bare portions on one side at regular intervals to detect any local deformation of the bumper reinforcement beam 30 outside the frame rail 16. The cladding 102 is preferably removed to form bare portions 106 at smaller intervals in the bend radius to give a timely indication of deformation between the bumper reinforcement beam 30 and the front side rail 16 and flange 24. The cladding 102 is preferably only removed in these sections of the fiber optic cable 92 to form bare portions 106 on one side of the cable in order to differentiate inward bending from outward bending.

The detection of the specific SORB impact mode of interest is obtained by comparing the detected light intensity signal to a predetermined light intensity signal corresponding to an impact severity justifying airbag deployment and deployment of the airbag when the detected light signal equals or exceeds the predetermined light intensity signal. The section of the fiber optic cable 92 mounted to the front rail 16 has no cladding removed, since the deformation of the front rail 16 will occur too late in the event to be of use for activating front side rail airbag system 35. Using this selective cladding removal technique, a single length of fiber optic cable 92 can be designed to perform timely flex sensing in a specific orientation and direction. The optical cable sensor can be bonded to a rear surface of the front bumper beam with an adhesive along substantially the entire length of the sensor in contact with the bumper and the front rail. The optical fiber sensor can also be mounted to the rear of the front bumper beam and the distal portion of the front rail at fixed points along its length by wire clamps 88 attached to the sensor as shown in FIG.

The SORB front rail mounted airbag system 35 disclosed herein is lightweight, requires minimum packaging, and utilizes well-proven inflator technology. Further, the disclosed SORB front rail mounted airbag system 35 does not interfere with efforts to optimize motor vehicle performance of the New Car Assessment Program (NCAP) 35 mph full frontal crash mode. That is, the disclosed SORB front rail mounted airbag system 35 may be deployed in all cases when a frontal crash component may exist (e.g., full frontal, offset frontal and angular impacts). While the SORB impact event may be sensed by the traditional front crash sensors for restraint deployment in frontal crashes, separate front bumper reinforcement beam-mounted sensors 58 provided improved performance.

It is to be understood that variations and modifications can be made on the aforementioned structure without departing from the concepts of the present invention, and further it is to be understood that such concepts are intended to be covered by the following claims unless these claims by their language expressly state otherwise.

We claim:

1. A sensing device for actuating an airbag system for mitigating intrusion in the event of an impact with an offset rigid barrier to a forward corner of a motor vehicle, the airbag system comprising a motor vehicle front rail having a forward projecting distal end, an airbag attached proximate the distal end of the front rail, the airbag having a stowed condition and an inflated condition, an inflator operationally coupled with the airbag responsive to electrical actuation for inflating the airbag with a gas, a flexible fiber optic impact detection sensor for generating a signal upon an impact event; and a controller for processing the signal generated by the detection sensor and electrically actuating the inflator upon computing a predetermined impact severity to the forward corner of the motor vehicle, wherein the airbag in the inflated condition acts against the offset rigid barrier so as to generate a lateral force against the offset rigid barrier to push the motor vehicle away from the barrier and thereby redirect impact energy by lateral movement of the motor vehicle.

2. The sensing device of claim 1, wherein a front bumper beam is attached to the distal end of the front rail and the sensor is mounted to the bumper and adapted to measure bending in the bumper.

3. The sensing device of claim 2, wherein the sensor is mounted directly to an outboard portion of a rear side of the front bumper beam.

4. The sensing device of claim 3, wherein the sensor is bonded to a rear surface of the front bumper beam with an adhesive along substantially the entire length of the sensor in contract with the bumper.

5. The sensing device of claim 3, wherein the sensor is mounted to a rear surface of the front bumper beam at fixed points along its length.

6. The sensing device of claim 5, wherein the sensor is mounted to the rear of the front bumper beam at fixed points along its length by wire clamps attached to the sensor.

7. The sensing device of claim 3, wherein the rear surface of the front bumper beam further comprises a channel and the sensor is disposed within the channel.

8. The sensing device of claim 1, wherein the flexible fiber optic sensor comprises a fiber optic cable, a light source, a photodiode, and an amplifier, and wherein the light source sends a light signal through the fiber optic cable, which is received by the photodiode and in turn which outputs an electrical signal from the amplifier proportional to the quantum of light received.

9. The sensing device of claim 8, wherein the fiber optic cable consists of a core material surrounded by a thin layer of cladding material having a different index of refraction than that of the core material, and wherein the cladding is modified by partial removal of the cladding to form a bare portion on the core material such that bending the fiber optic cable changes the quantum of light that escapes from the fiber optic cable, whereby the signal of the photodiode will be changed, indicating the quantum of bending of the fiber optic cable.

10. The sensing device of claim 9, wherein the cladding is removed on only one side of the fiber optic cable to detect a directional signal indicating whether the fiber optic cable is bending towards the bare portion of the modified side of the fiber optic cable or away from it.

11. The sensing device of claim 9, wherein the flexible fiber optic sensor is adapted to provide a signal to detect an offset crash mode by mounting the fiber optic cable to a back surface of a front bumper beam and the distal portion of the front rail, thereby causing the flexible fiber optic sensor to sense any rearward bending of the front bumper beam.

12. The sensing device of claim 11, wherein the cladding is removed to form bare portions in predetermined areas along the length of the fiber optic cable at first regular intervals proximate the front bumper beam to detect local deformation of the front bumper beam.

13. The sensing device of claim 12, wherein the cladding is removed to form bare portions at second smaller intervals in a bend radius between the front bumper beam and the distal portion of the front rail to indicate deformation between the front bumper beam and the front rail.

14. The sensing device of claim 13, wherein a portion of the fiber optic cable mounted to the front rail has no cladding removed.

15. The sensing device of claim 8, wherein the light source is an infrared light emitting diode.

16. The sensing device of claim 8, wherein the photodiode is an infrared detector.

17. A method of deploying a motor vehicle airbag system, the method comprising the steps of:
providing a motor vehicle front rail having a forward projecting distal end;
providing an airbag having a stowed condition and an inflated condition;
equipping the airbag with an inflator operationally coupled with the airbag responsive to electrical actuation for inflating the airbag with a gas;

providing a flexible fiber optic sensor for generating a signal upon an offset impact event;

mounting the fiber optic cable to a back surface of a front bumper beam and the distal portion of the frame rail, thereby causing the flexible fiber optic sensor to sense any rearward bending of the front bumper beam;

providing a controller for processing the signal generated by the detection sensor; and electrically actuating the inflator upon a predetermined impact severity to the vehicle.

18. The method of claim 17, wherein the flexible fiber optic sensor comprises a fiber optic cable, a light source, a photodiode, and an amplifier and wherein the method further comprises the steps of:

sending a light signal from the light source through the fiber optic cable;

receiving the light signal by the photodiode;

outputting an electrical signal from the amplifier proportional to the quantum of light received;

comparing the outputted electrical signal to a predetermined signal strength corresponding to the predetermined impact severity; and deploying the airbag if the strength of the outputted electrical signal equals or exceeds the signal strength corresponding to the predetermined impact severity.

19. An airbag system for mitigating intrusion in the event of an impact with an offset rigid barrier to a forward corner of a motor vehicle, the airbag system comprising:

a motor vehicle front rail having a forward projecting distal end, an airbag attached proximate the distal end of the front rail, the airbag having a stowed condition and an inflated condition, an inflator operationally coupled with the airbag responsive to electrical actuation for inflating the airbag with a gas;

a flexible fiber optic impact detection sensor comprising a fiber optic cable, a light source, a photodiode, and an amplifier, the flexible fiber sensor adapted to generate a signal to detect an offset crash mode by mounting the fiber optic cable to a back surface of a front bumper beam and the distal portion of the front rail, thereby causing the flexible fiber optic sensor to sense any rearward bending of the front bumper beam, the fiber optic cable further comprising a core material surrounded by a thin layer of cladding material having a different index of refraction than that of the core material, wherein the cladding is modified by partial removal of the cladding to form a bare portion on the core material in predetermined areas along the length of the fiber optic cable at first regular intervals proximate the front bumper beam to detect local deformation of the front bumper beam such that bending the fiber optic cable changes the quantum of light that escapes from the fiber optic cable, and the cladding is removed to form bare portions at second smaller intervals in a bend radius between the front bumper beam and the distal portion of the front rail such that bending the fiber optic cable changes the quantum of light that escapes from the fiber optic cable to indicate deformation between the front bumper beam and the front rail, wherein the light source sends a light signal through the fiber optic cable that is received by the photodiode and in turn which outputs an electrical signal from the amplifier proportional to the quantum of light received, and the electrical signal of the photodiode changes to indicate the quantum of bending of the fiber optic cable;

and a controller for processing the signal generated by the detection sensor and electrically actuating the inflator upon computing a predetermined impact severity to the forward corner of the motor vehicle, wherein the airbag in the inflated condition acts against the offset rigid barrier so as to generate a lateral force against the offset rigid barrier to push the motor vehicle away from the barrier and thereby redirect impact energy by lateral movement of the motor vehicle.

20. The sensing device of claim 19, wherein a portion of the fiber optic cable mounted to the front rail has no cladding removed.

* * * * *